(12) United States Patent
Chan et al.

(10) Patent No.: US 10,805,469 B1
(45) Date of Patent: *Oct. 13, 2020

(54) SYSTEMS AND METHODS FOR INTELLIGENT ROUTING CALL CENTER SOLUTIONS

(71) Applicant: Allstate Insurance Company, Northbrook, IL (US)

(72) Inventors: Brian Chan, Lincolnshire, IL (US); Keith Brodie, Northbrook, IL (US); Amanda Kruse, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,574

(22) Filed: Mar. 19, 2020

Related U.S. Application Data

(63) Continuation of application No. 16/542,587, filed on Aug. 16, 2019, now Pat. No. 10,637,991.

(51) Int. Cl.
*H04M 3/00* (2006.01)
*H04M 3/523* (2006.01)
*H04M 3/42* (2006.01)

(52) U.S. Cl.
CPC ..... *H04M 3/5235* (2013.01); *H04M 3/42068* (2013.01)

(58) Field of Classification Search
CPC .. H04M 3/5175; H04M 3/523; H04M 3/5191; H04M 3/5183; H04M 3/5166; H04M 3/5232; H04M 3/5233; H04M 3/5235; H04M 3/51

USPC ........... 379/265.01–265.02, 265.09, 265.13, 379/266.02
See application file for complete search history.

(56) References Cited

U.S. PATENT DOCUMENTS

| | | |
|---|---|---|
| 6,798,876 B1 | 9/2004 | Bala |
| 7,158,628 B2 | 1/2007 | McConnell et al. |
| 8,488,774 B2 | 7/2013 | Mahalaha et al. |
| 8,831,205 B1 | 9/2014 | Wu et al. |
| 9,031,224 B1 | 5/2015 | Warder |
| 9,307,085 B1 | 4/2016 | Hanson et al. |
| 9,369,579 B2 | 6/2016 | Awad et al. |
| 10,115,130 B1 | 10/2018 | Webster |
| 10,389,872 B1 | 8/2019 | Cox |

OTHER PUBLICATIONS

Intelligent call routing: In-depth guide [2019 update] (https://blog.aimultiple.com/intelligent-call-routing/); accessed Jan. 1, 2019.

*Primary Examiner* — Rasha S Al Aubaidi
(74) *Attorney, Agent, or Firm* — Dinsmore & Shohl, LLP

(57) ABSTRACT

Intelligent routing systems and methods of use to match a user from a user call with a unique ID associated with the user, generate a plurality of call reason predictions for the user call with an intelligent router module of the intelligent routing system based on the unique ID, generate a confidence level and a likelihood rating with the intelligent router module for each call reason prediction of the plurality of call reason predictions, determine a call reason prediction with a highest likelihood rating and such that the confidence level for the call reason prediction exceeds an associated confidence level threshold that is machine learned and adjustable, determine a call routing service mode from a plurality of service modes based on the call reason prediction, and route the user call to the call routing service mode.

20 Claims, 5 Drawing Sheets

SYSTEMS AND METHODS FOR INTELLIGENT ROUTING CALL CENTER SOLUTIONS

CROSS-REFERENCE TO RELATED APPLICATIONS

The present disclosure is a continuation and claims priority to U.S. patent application Ser. No. 16/542,587, filed Aug. 16, 2019, entitled "SYSTEMS AND METHODS FOR INTELLIGENT ROUTING CALL CENTER SOLUTIONS," the entirety of which is incorporated by reference herein.

TECHNICAL FIELD

The present disclosure relates to intelligent routing call center solutions and, in particular, an intelligent router module for call center solutions to provide a call reason prediction for an identified user and to route the identified user to an associated service mode based on the call reason prediction and intelligent router logic.

BACKGROUND

Call centers may receive a high volume of calls that are routed through interactive voice response (IVR) systems. Accordingly, a need exists for alternative routing solutions that utilize IVR systems to result in an expedited and streamlined routing of calls and an efficient handling of the high volume of calls.

BRIEF SUMMARY

According to the subject matter of the present disclosure, an intelligent routing system may include one or more processors, one or more memory components communicatively coupled to the one or more processors, and machine readable instructions stored in the one or more memory components. The machine readable instructions may cause the intelligent routing system to perform at least the following when executed by the one or more processors: match a user from a user call with a unique ID associated with the user; generate a plurality of call reason predictions for the user call with an intelligent router module of the intelligent routing system based on the unique ID; generate a confidence level and a likelihood rating with the intelligent router module for each call reason prediction of the plurality of call reason predictions; and determine a call reason prediction with a highest likelihood rating and such that the confidence level for the call reason prediction exceeds an associated confidence level threshold that is machine learned and adjustable. The machine readable instructions may further cause the intelligent routing system to perform at least the following when executed by the one or more processors: determine a call routing service mode from a plurality of service modes based on the call reason prediction; and route the user call to the call routing service mode.

According to another embodiment of the present disclosure, a method of implementing an intelligent routing system to route a user call may include matching a user from the user call with a unique ID associated with the user, generating a plurality of call reason predictions for the user call with an intelligent router module of the intelligent routing system based on the unique ID, and generating a confidence level and a likelihood rating with the intelligent router module for each call reason prediction of the plurality of call reason predictions. The method may further include determining a call reason prediction with a highest likelihood rating and such that the confidence level for the call reason prediction exceeds an associated confidence level threshold that is machine learned and adjustable, determining a call routing service mode from a plurality of service modes based on the call reason prediction, and routing the user call to the call routing service mode.

According to yet another embodiment of the present disclosure, a method of implementing an intelligent routing system to route a user call may include matching a user from the user call with a unique ID associated with the user, generating a plurality of call reason predictions for the user call with an intelligent router module of the intelligent routing system based on the unique ID, and generating a confidence level and a likelihood rating with the intelligent router module for each call reason prediction of the plurality of call reason predictions. The unique ID may be an insurance policy number of an insurance policy associated with the user. The method may further include determining a call reason prediction with a highest likelihood rating and such that the confidence level for the call reason prediction exceeds an associated confidence level threshold, determining a call routing service mode from a plurality of service modes based on the call reason prediction, and routing the user call to the call routing service mode.

Although the concepts of the present disclosure are described herein with primary reference to a call center solution, it is contemplated that the concepts will enjoy applicability to any setting for purposes of intelligent routing solutions, such as a business setting or otherwise, including and not limited to a customer service request, such as through voice, digital, online, or other like transmission technologies.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein, an intelligent router module for call center solutions is configured to provide a call reason prediction for an identified user and to route the identified user to an associated service mode based on the call reason prediction and intelligent router logic, as described in greater detail below. Embodiments of the present disclosure are directed to an intelligent router system for a call center that includes a call reason prediction model implemented by an intelligent router module, which is described in greater detail further below.

Figure 1:
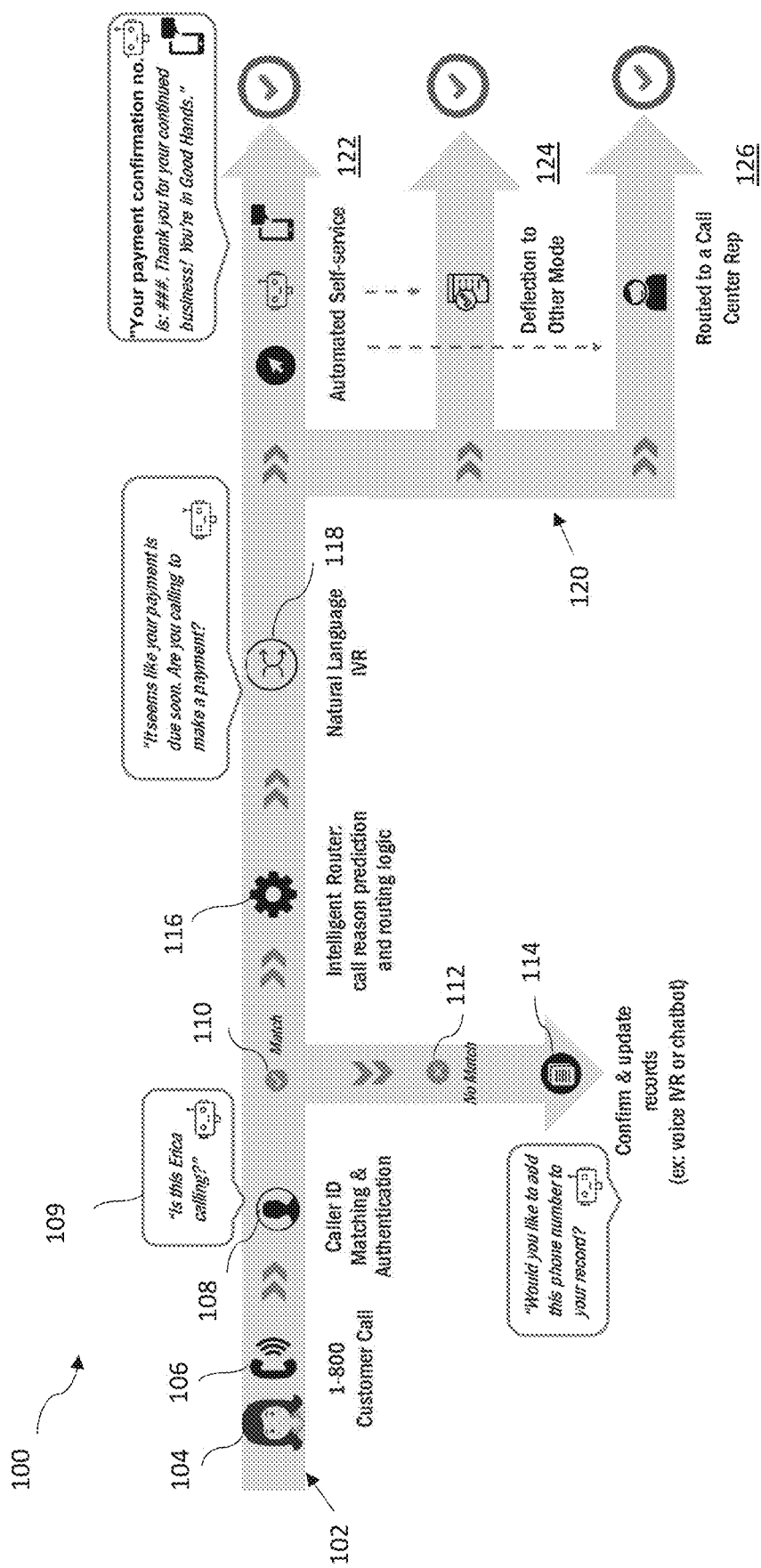
FIG. 1 illustrates an intelligent routing solution utilizing an intelligent router, according to one or more embodiments shown and described herein.
Figure 3:
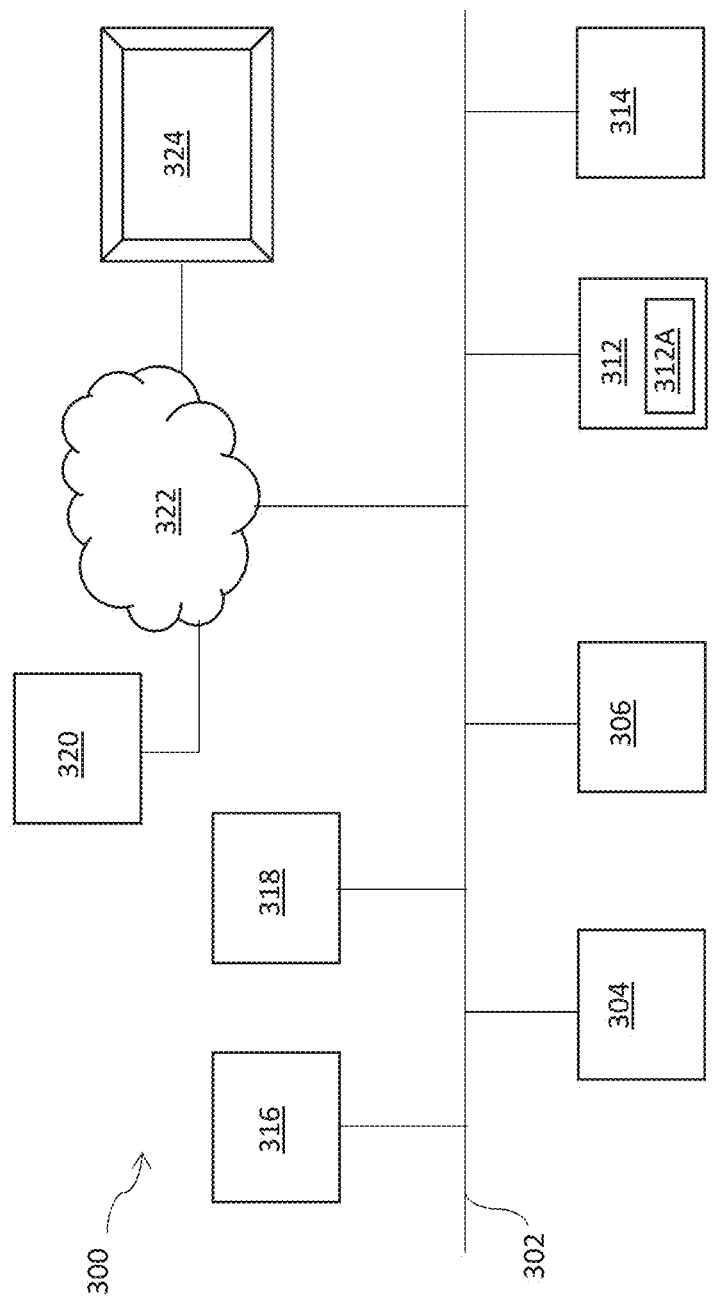
FIG. 3 illustrates a computer implemented system including an intelligent router module and for use with the process flow of FIG. 2 and the intelligent routing solution of FIG. 1, according to one or more embodiments shown and described herein.

Referring to FIG. 1, an intelligent routing solution 100 is shown utilizing an intelligent router 116 of an intelligent routing system 300 (FIG. 3). The intelligent routing solution 100 first determines along a determination path 102 whether a user 104 transmitting a user call 106 received by the intelligent routing system 300 is an identified user through a caller identification (ID) matching and identification process 108. For example, an interactive voice response (IVR) system 109 may ask the user 104 if a name associated with call number from which the user 104 is the name of the user 104 making the call. Based on a negative confirmation, a no match determination 112 is made and the user 104 is sent to an update module 114 to confirm and update records and/or to provide further assistance through voice IVR or a chatbot system (such as a chat or text through an application tool associated with the intelligent routing system 300, as described in greater detail below). A positive confirmation of a match between an incoming user and the phone number making the call may be used to identify the user 104 to then generate a call reason prediction as described herein and in greater detail further below based on the match and user identification.

Thus, alternatively, based on a positive confirmation, a match determination 110 is made such that the intelligent routing solution 100 transmits the user call 106 to the intelligent router 116, which is associated with the intelligent router module 312 of the intelligent routing system 300 as described in greater detail further below. The match determination 110 further results in a match of the identified user 104 with a unique party ID, such as based on a policy number of a caller who is calling an insurance company. Upon the match determination 110, intelligent routing solution 100 will provide various caller data associated with the unique party ID and stored in a database (e.g., a database 314 as described with respect to the intelligent routing system 300 further below) to the call reason prediction model of the intelligent router 116. Such caller data may be based on data such as event data (e.g., data based on real-time or prior web, app, or mobile interactions), known data (e.g., policy data, claims data, external data, person-level data, and/or demographic data), and/or derived data (e.g., through personalization, a customer journey model, or an auto shopping trigger). For example, such data may be based on caller patterns from past interactions or based on real time monitoring of caller technology associated with the business, such as caller use of a business mobile application. Embodiments of event data may include parameters for the identified user 104 making the user call 106, such as a start of payment time information or a vehicle add request information. Embodiments of known data may involve parameters such as a number of times the identified user 104 has made a call 106, a most recent previous user call 106, or the status of a currently pending claim for the identified user 104. Embodiments of derived data may include parameters such as a history of use of technologies to submit the user call 106 such as, but not limited to, use of a web portal, client application, or a telephone, and/or use of a password when utilizing such technologies. A history of customer activities may be incorporated within the customer journey model to provide customer specific information regarding customer service experiences.

The intelligent router 116 includes the call reason prediction model and routing logic to generate a call reason prediction for the call based on a process 200 (FIG. 2), as described in greater detail below. An IVR 118 may be employed to assist with generation or confirmation of the call reason prediction, such as by questioning the user 104 whether the user 104 is calling to make a payment based on a determination that a payment for the user 104 is due in an upcoming time period. In an embodiment, the IVR 118 may be a natural language IVR.

The call reasons prediction model, based on the input associated with the unique party ID, will determine a likelihood that the user 104 is calling for a particular reason and will automatically route the user 104 based on the call reason prediction. The routing may include routing to a particular service modality of a plurality of service modes 120 (e.g., self-service, voice chat, mobile app, chat, asynchronous text, licensed call center representative, unlicensed call center representative, etc.) based on the call reason prediction. The routing may be accompanied by prompts to the user 104 to confirm routing, which prompts may be natural language prompts.

The intelligent routing solution 100 thus utilizes the call reason prediction to select one of a plurality of service modes 120 to which to route the user call 106. As a non-limiting example, the user call 106 may be sent to an automated self-service mode 122, such as when the user 104 confirms a desire to pay a bill and the user call 106 is sent to the automated self-service mode 122 to pay the bill automatically and to receive an automatic confirmation of the bill payment. During use of the automated self-service mode 122, the user 104 may indicate a desire to be routed to an alternative service mode 124 or to a live call center representative service mode 126 for assistance from alternative automated, partially-automated, or manual service modes. The intelligent routing solution 100 may be configured to route the user call 106 to a select service mode of the plurality of service modes 120 based on the call reason prediction, and the select service mode may be one of automated, partially-automated, or manual.

Figure 2:
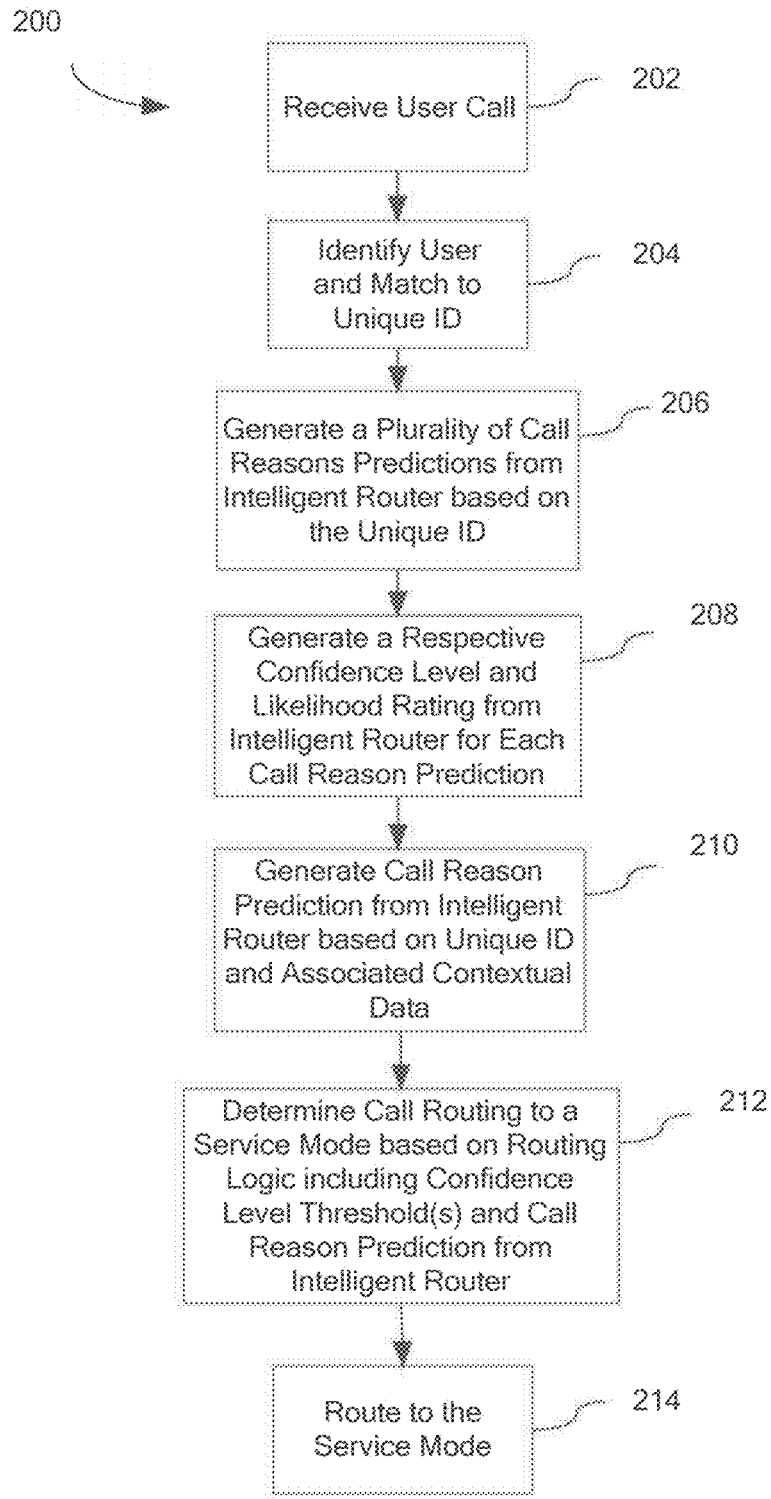
FIG. 2 illustrates a flowchart process for use of the intelligent routing solution of FIG. 1.

Referring to FIG. 2, an embodiment of the process 200 is shown for use of the intelligent routing solution 100 of FIG. 1 (as implemented by the intelligent routing system 300 of FIG. 3 described in greater detail below). In block 202, the user call 106 from the user 104 is received by the intelligent routing system 300. The user call 106 may be an event that is a call or an electronic communication such as an e-mail or chat message. For instance, the call may be a video call and/or an audio call from a telephone number associated with the user 104. The electronic communication may be at least one of an email or an electronic contact, such as a chat, text, or video call, from an application tool. The application tool to transmit the user call 106 for call reason prediction in block 210 described below and route the call in block 212 as described below may be associated with the intelligent routing system 300 and a mobile client device and/or other computing device 324, as will further be described in greater detail further below. In an embodiment, the user call 106 may be to address a password lockout situation, and the intelligent routing system 300 may determine the call reason prediction in block 210 to be a password reset and automatic route password reset instructions back to the user 104 in block 212 based on the process 200 as described below.

In block 204, the user 104 of the user call 106 is identified prior to matching the user 104 from the user call 106 with the unique ID associated with the user 104. The user 104 from the user call 106 is then matched with the unique ID associated with the user 104. The unique ID may include an associated user profile and an associated user call history for the user 104 as contextualized information. In an embodiment, the unique ID may be an insurance policy number of an insurance policy associated with the user 104. In other aspects, the unique ID may comprise a claim number associated with the user 104, a vehicle identification number (VIN) associated with the user 104, an email number associated with the user 104, a phone number associated with the user 104, or other alpha-numeric identifier associated with the user 104. As described herein, the caller data associated with the unique ID may be based on data such as event data (e.g., data based on real-time or prior web, app, or mobile interactions), known data (e.g., policy data, claims data, external data), and/or derived data (e.g., through personalization, a customer journey model, or an auto shopping trigger). Such data may be based on caller patterns from past interactions (e.g., through derived data from a stored customer journey model) and/or based on real time monitoring of caller technology associated with the business, such as caller use of a business mobile application.

In block 206, a plurality of call reason predictions for the user call 106 is generated with the intelligent router module 312 of the intelligent routing system 300 based on the unique ID and/or associated contextualized information generated from a data aggregation and transformation scheme based on the unique ID match in block 204. The data aggregation and transformation scheme based on the unique ID match to provide user contextualized information from which to generate the plurality of call reason predictions may include real-time and/or stored historical user data. Real-time data may be retrieved from customer online activities and/or real-time monitoring of customer activity, and may assist with predicting when a customer interacting with a mobile or web based application is about to place a voice call along with a predicted call reason utilizing the user based data. Data type feeds for the data aggregation and transformation scheme in the intelligent router module 312 may thus include customer event data, transaction data, and/or other prediction data as described herein to generate such contextualized information.

By way of example, and not as a limitation, the plurality of call reason prediction may be, for a billing call reason, a claim call reason, or another call or service reason (e.g., other payment call reason, transfers call reasons, license call reason, and the like). As described herein, a call reason may be associated with a service request that may be submitted through voice or non-voice technologies, such as through a mobile or web-based online application tool. Thus, a "call" may be associated with one or more types of customer service requests submitted through a recordable communication. Further, in block 208, a confidence level and a likelihood rating is generated with the intelligent router module 312 for each call reason prediction of the plurality of call reason predictions. By way of example, and not as a limitation, the unique ID associated with the user call 106 may provide the intelligent router module 312 with data regarding the user 104 history from the stored customer journey model, such as data indicative that the user has recently filed a claim and/or provided vehicle images for a claim filing within a predetermined period of time. Then intelligent router module 312 may generate a plurality of call reasons, each having a respective confidence levels and likelihood ratings, which plurality of call reasons may be generated with a higher likelihood rating for a claim call reason over other reasons, such as a billing call reason or license call reason.

In block 210, a call reason prediction is generated from the intelligent router 116 based on the unique ID associated with the user 104 and associated contextual data. The intelligent router module 312 determines the select call reason prediction from the plurality of call reason predictions to be the call reason prediction with a highest likelihood rating and such that the confidence level for the call reason prediction exceeds an associated confidence level threshold. The associated confidence level threshold may be machine learned and adjustable. As a non-limiting example, a training data set is used with machine learning to develop a confidence level prediction model for a reasons, such as for a billing reason. A distribution of confidences for each trained data set is generated from which an optimization along the distribution to optimize a point between accuracy and volume of the trained data set is further generated. The optimization from the machine learned training data sets is able to be adjusted as additional training data is utilized to generate the adjustable distribution and associated optimization to generate the machine learned and adjustable confidence level threshold.

In an embodiment, the select call reason prediction may be, for one of a billing call reason, a claim call reason, or another call reason (e.g., other payment call reason, transfers call reasons, license call reason, and the like). In embodiments, a certain type of call reason may be indicated to be preferred as a reason over another type of call reasons (such as the claim call reason being preferred over the billing call reason). In other embodiments, the billing call reason may be preferred or have a higher likelihood over other call reason predictions but may not be selected unless a certain, adjustable, and machine learned confidence level threshold associated with the billing call reason is exceeded.

In block 212, call routing to a select service mode of the plurality of service modes 120 is determined based on routing logic including one or more confidence level thresholds and the call reason prediction from the intelligent router 116. Indeed, the intelligent routing system 300 is configured to determine a call routing service mode from a plurality of service modes 120 based on the call reason prediction and routing logic as described herein. In embodiments, the routing logic is configured to associate each of the plurality of call reasons predictions with a select service mode of the plurality of service modes 120.

In block 214, the user call 106 is routed to the select service mode. For instance, the intelligent routing system 300 is configured to route the user call 106 to the call routing service mode that is selected as the select service mode of the plurality of service modes 120 based on the call reason prediction and routing logic as described herein. Such routing as described herein allows for a customized and/or personalized routing for the user call 106 of the identified user 104 per the process 200. For example, the routing may be customized based on determined needs and/or preferences of the identified user 104. In embodiments, while an IVR to IVR voice based routing may occur, other routing to self-service solutions may be employed as well, such as routing to an online portal and/or an automatic or manual chat interaction.

As a non-limiting embodiment, the call reason prediction model may determine that the user 104 is most likely calling to pay a bill based on the unique party ID associated input for the user 104 and will route the user 104 to a billing representative. Other reasons may exist, such as a claims related call for the user 104 calling an insurance company such that the user 104 is routed to claims personnel. The predicted reasons with the highest likelihood as an output from the call reason prediction model will determine how to route the call. Certain reasons may have to exceed predetermined or machine learned adjustable confidence level thresholds prior to permitting the intelligent router 116 to route the user 104 based on the predicted call reason. For example, a billing likelihood as a predicted reason for calling may require a certain threshold to be passed prior to routing the user 104 to billing department personnel.

FIG. 3 illustrates a computer implemented intelligent routing system 300 for use with the process 200 of FIG. 2. Referring to FIG. 3, a non-transitory, intelligent routing system 300 for implementing a computer and software-based method, such as directed by the intelligent routing solution 100 and the process 200, to route a user call 106 as described herein. The intelligent routing system 300 comprises a communication path 302, one or more processors 304, a non-transitory memory component 306, an intelligent router module 312, a data contextualization sub-module 312A of the intelligent router module 312, a storage or database 314, a machine learning module 316, a network interface hardware 318, a network 322, a server 320, and a computing device 324. The various components of the intelligent routing system 300 and the interaction thereof will be described in detail below.

While only one server 320 and one computing device 324 is illustrated, the intelligent routing system 300 can comprise multiple servers containing one or more applications and computing devices. In some embodiments, the intelligent routing system 300 is implemented using a wide area network (WAN) or network 322, such as an intranet or the internet. The computing device 324 may include digital systems and other devices permitting connection to and navigation of the network. It is contemplated and within the scope of this disclosure that the computing device 324 may be a personal computer, a laptop device, a smart mobile device such as a smart phone or smart pad, or the like. Other intelligent routing system 300 variations allowing for communication between various geographically diverse components are possible. The lines depicted in FIG. 3 indicate communication rather than physical connections between the various components.

The intelligent routing system 300 comprises the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the intelligent routing system 300. As used herein, the term "communicatively coupled" means that coupled components are capable of exchanging data signals with one another such as, for example, electrical signals via conductive medium, electromagnetic signals via air, optical signals via optical waveguides, and the like.

The intelligent routing system 300 of FIG. 3 also comprises the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the intelligent routing system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

The illustrated system 300 further comprises the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3, as noted above, the intelligent routing system 300 comprises the display such as a graphical user interface (GUI) on a screen of the computing device 324 for providing visual output such as, for example, information, graphical reports, messages, or a combination thereof. The display on the screen of the computing device 324 is coupled to the communication path 302 and communicatively coupled to the processor 304. Accordingly, the communication path 302 communicatively couples the display to other modules of the intelligent routing system 300. The display can comprise any medium capable of transmitting an optical output such as, for example, a cathode ray tube, light emitting diodes, a liquid crystal display, a plasma display, or the like. Additionally, it is noted that the display or the computing device 324 can comprise at least one of the processor 304 and the memory component 306. While the intelligent routing system 300 is illustrated as a single, integrated system in FIG. 3, in other embodiments, the systems can be independent systems.

The intelligent routing system 300 comprises the intelligent router module 312 as described above to at least generate a plurality of call reason predictions for the user call 106 based on the unique ID, the data contextualization sub-module 312A to provide contextual data for the user call 106 such as through the unique ID including an associated user profile and an associated user call history, and the machine learning module 316 for generating a confidence level threshold that is machine learned and adjustable for a respectively associated call reason prediction of the plurality of call reason predictions. The machine learning module 316 may include an artificial intelligence component to train and provide machine learning capabilities to a neural network as described herein. As set forth above, certain call reason predictions may have to exceed predetermined or machine learned adjustable confidence level thresholds prior to permitting the intelligent router 116 to route the user 104 based on the selected call reason prediction having the highest likelihood rating of the plurality of call reason predictions. As a non-limiting example, a billing likelihood as a selected call reason prediction having the highest likelihood (e.g., a highest probability) may require a certain threshold to be passed prior to routing the caller to billing department personnel, and the certain threshold may not be a static predetermined threshold but one that is machine learned and adjustable to be a dynamic threshold based on one or more adjustable and/or additional parameters. For instance, as more data is added to the database from which the certain threshold is determined, the certain threshold may be adjusted to be more accurate in view of the updated data set and based on one or more parameters used to calculate the certain threshold. In embodiments, there may be a tradeoff between the number of users prompted for data analytics stored in a database for machine learning associated with a particular reason and the level of associated accuracy for the data analytics for the particular reason, and the certain threshold may be based on the tradeoff that is reflective of the accuracy of the machine learned system over time and thus be adjustable over time. In additional or alternative embodiments, the certain threshold may be a threshold within a certain percentage range or a predetermined threshold.

The intelligent router module 312, the data contextualization sub-module 312A, and the machine learning module 316 are coupled to the communication path 302 and communicatively coupled to the processor 304. As will be described in further detail below, the processor 304 may process the input signals received from the system modules and/or extract information from such signals.

Data stored and manipulated in the intelligent routing system 300 as described herein is utilized by the machine learning module 316, which is able to leverage a cloud computing-based network configuration such as the cloud to apply Machine Learning and Artificial Intelligence. This machine learning application may create models that can be applied by the intelligent routing system 300, to make it more efficient and intelligent in execution. As an example and not a limitation, the machine learning module 316 may include artificial intelligence components selected from the group consisting of an artificial intelligence engine, Bayesian inference engine, and a decision-making engine, and may have an adaptive learning engine further comprising a deep neural network learning engine.

The intelligent routing system 300 comprises the network interface hardware 318 for communicatively coupling the intelligent routing system 300 with a computer network such as network 322. The network interface hardware 318 is coupled to the communication path 302 such that the communication path 302 communicatively couples the network interface hardware 318 to other modules of the intelligent routing system 300. The network interface hardware 318 can be any device capable of transmitting and/or receiving data via a wireless network. Accordingly, the network interface hardware 318 can comprise a communication transceiver for sending and/or receiving data according to any wireless communication standard. For example, the network interface hardware 318 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 3, data from various applications running on computing device 324 can be provided from the computing device 324 to the intelligent routing system 300 via the network interface hardware 318. The computing device 324 can be any device having hardware (e.g., chipsets, processors, memory, etc.) for communicatively coupling with the network interface hardware 318 and a network 322. Specifically, the computing device 324 can comprise an input device having an antenna for communicating over one or more of the wireless computer networks described above.

The network 322 can comprise any wired and/or wireless network such as, for example, wide area networks, metropolitan area networks, the internet, an intranet, satellite networks, or the like. Accordingly, the network 322 can be utilized as a wireless access point by the computing device 324 to access one or more servers (e.g., a server 320). The server 320 and any additional servers generally comprise processors, memory, and chipset for delivering resources via the network 322. Resources can include providing, for example, processing, storage, software, and information from the server 320 to the intelligent routing system 300 via the network 322. Additionally, it is noted that the server 320 and any additional servers can share resources with one another over the network 322 such as, for example, via the wired portion of the network, the wireless portion of the network, or combinations thereof.

Figure 4:
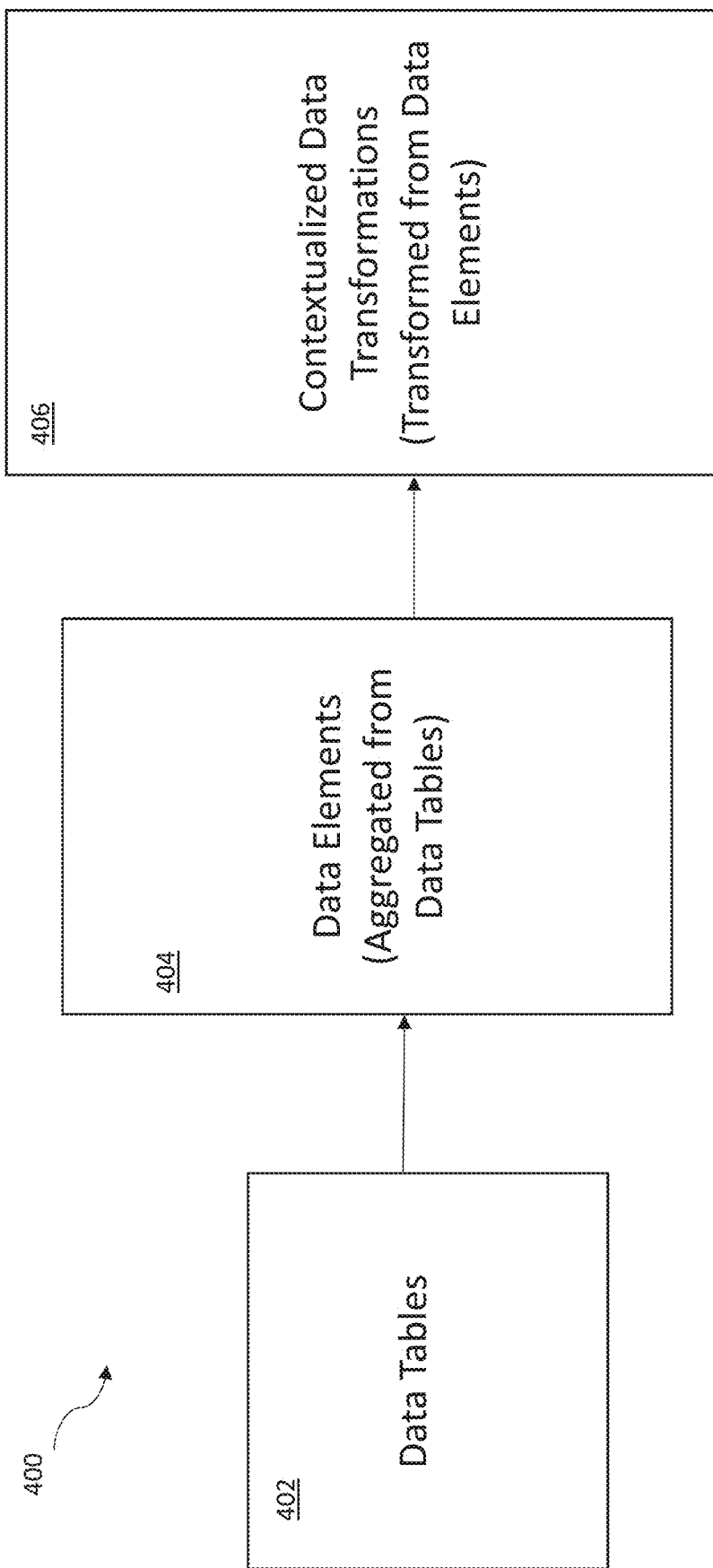
FIG. 4 illustrates a flowchart process for use with a data contextualization sub-module of the intelligent router module and system of FIG. 3, according to one or more embodiments shown and described herein.

Referring to FIG. 4, a process 400 is shown for use with the data contextualization sub-module 312A of the intelligent router module 312 and system 300 of FIG. 3. The data contextualization sub-module 312A is configured to perform an aggregation on data tables 402 to derive data elements 404, and then to transform data elements 404 into contextualized data transformations 406. In embodiments, such data may be based on data such as event data (e.g., data based on real-time or prior web, app, or mobile interactions), known data (e.g., policy data, claims data, external data), and/or derived data (e.g., through personalization, a customer journey model, or an auto shopping trigger).

In a transform embodiment of the process 400 of FIG. 4, as a non-limiting example, five data tables 402 are aggregated into fifteen data elements 404, which are then transformed into a plurality of data transformations 406. The transform embodiment may be directed to an insurance company and claim policies maintained by the insurance company through one or more data tables 402. The five data tables 402 in the transform embodiment may include a Claim Policy table listing available claim policies associated with unique IDs and identified users, a Bill Cash table, a Bill Document table, a Bill Premium Posting table, and a Bill Policy Accounting table, each table including information associated with the identified users per their billing histories. The five billing data tables 402 in the transform embodiment may be aggregated into fifteen data elements 404 as follows: claim reported, claim closed, claim denied, claim reopened, bad check, charge off, late fee paid, late payment made, credit card fraud, collection bill, renewal cancellation, recalculated bill date, full pay indicator, lapsed credit, and changed bill method. The fifteen data elements 404 may then be transformed into a plurality of contextualized data transformations 406, such as days since a last event of a certain type, a count of the event of the certain type over a preset period, such as two years, and/or an indicator for an active claim feature created from claim opened and closed dates. For instance, the plurality of contextualized data transformations 406 may include, but not be limited to, (1) days from a most recent claim opened to day of a call event; (2) days from a most recent recalculated bill date to day of the call event; and (3) number of times a policy has had a late fee paid in a period of time (such as two years) leading up to the call event.

Figure 5:
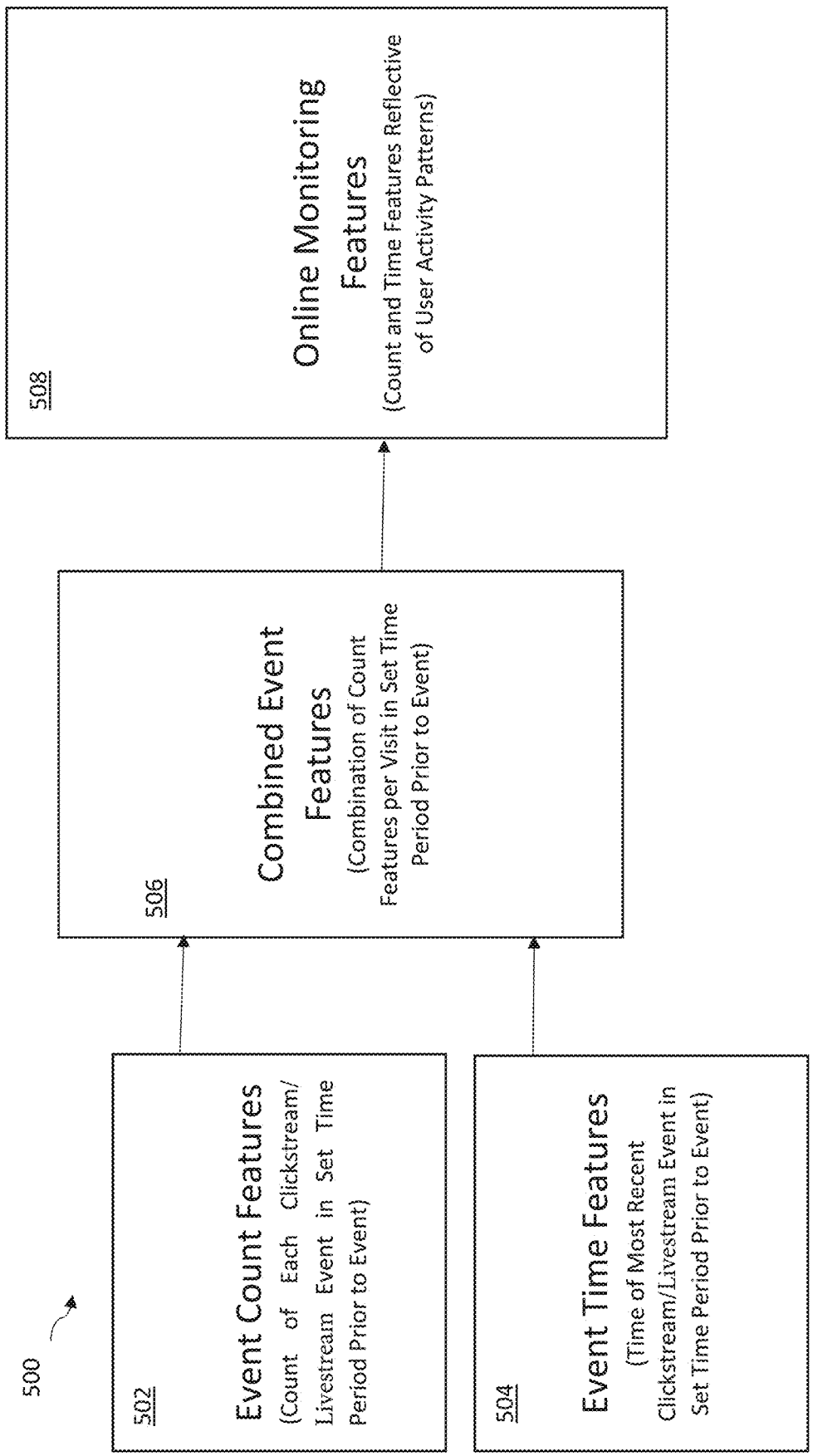
FIG. 5 illustrates a flowchart process for online activity use with the data contextualization sub-module of the intelligent router module and system of FIG. 3, according to one or more embodiments shown and described herein.

Referring to FIG. 5, a process 500 is shown for online activity use with the data contextualization sub-module 312A of the intelligent router module 312 and system 300 of FIG. 3. The data contextualization sub-module 312A is configured to combine event features such as event count features 502 and event time features 504 into combined event features 506 and to conduct online monitoring through online monitoring features 508 of such combined event features 506.

In embodiments, the event (e.g., the user call 106) may be a clickstream event transmitted by the application tool, and intelligent routing system 300 is configured to count instances of each clickstream event and/or livestream event in a set time period prior to the event to generate event count features 502. A clickstream event may include offline back user online events, and a livestream event may include a real-time version of back user online events. As a non-limiting online activity example, the event count features 502 may be directed to a count of each clickstream event (whether a call or through use of a computing device, such as through an application tool on a smartphone or computer) in a set time period prior to the event (such as 30 days). By way of example, and not as a limitation, the event count features 502 may include a claim start count, a claim completed count, a requested photo started count, a requested photo completed count, a payment started count, a payment completed count, a call claim representative count, a call agent count, a user ID recovery started count, and a user ID recovery completed count.

The intelligent routing system 300 may be configured to employ a process 500 to combine the event count features 502 with associated event time features 504 to generate combined event features 506. In an embodiment, the event time features 504 may be directed to a time of a most recent clickstream event in the set time period prior to the event. By way of example, and not as a limitation, the event time features 504 may include an hour associated from a call time to a most recent visit time, such as the hour when a claim started event occurred and/or an hour when a call agent event occurred. The combined event features 506 may be directed to a combination of count features per visit in the set time period prior to the event. By way of example, and not as a limitation, the combined event features 506 may include a listing of all complete payments associated with timings of payment start to payment completion, a listing of incomplete payments associated with timings of payment started to present time, and a combined listing of incomplete and complete payments with respective associated timings (to present time or to payment completion timing). Examples of associated payment completion tracking algorithms may be implemented with rules as follows:

payment_allComplete:
payment started=payment completed
payment_noneComplete:
payment started >0 &
payment completed=0
payment_someComplete:
payment started >0 &
payment completed >0 &
payment completed !=payment started With respect to the examples above, a complete payment note with respect to a payment started status may be implemented (e.g., payment_allComplete: payment started=payment completed) upon indication of a completed payment. A pending payment status with none completed note with respect to the payment started status may be implemented (e.g., payment_nonComplete: payment started>0 &) upon indication of no payments completed. Further a pending payment status with some completed note with respect to the payment started status may be implemented (e.g., payment completed=0, payment_someComplete: payment started>0 & payment completed>0 & payment completed !=payment started) such that payment completed is not equal to payment started upon indication of some but not all payments completed. The intelligent routing system 300 may further be configured to online monitor the combined event features 506 through online monitoring features 508 to generate one or more trends based on user activity patterns. In an aspect, the plurality of call reason predications are based on the one or more trends based on user activity patterns from the online monitoring features 508.

The online monitoring features 508 activity may be directed to monitoring count and time features that are reflective of user specific activity patterns through user specific monitored online activities. By way of example, and not as a limitation, online monitoring features 508 may include an hour of a call event to most recent event tracking, an average/sum of a visit duration, visits in the last 7 days, visits in the last 30 days, and/or a ratio of visits from last 7 days to last 30 days.

In embodiments, the intelligent routing solution systems and methods as described herein assist to significantly reduce inefficiencies associated with routing of calls incoming to a call center and to reduce such call volume by efficiently handling calls in a first instance, for example. As a non-limiting example, such calls may be received as incoming voice calls to a call center, though such calls may alternatively be application tool calls, such as through chats or digital interactions from a mobile or web-based application tool to provide a customized and personalized user experience independent of a type of call communication channel utilized. The intelligent routing solution systems and methods further increase an adoption of self-service as an automated mode through such efficient, automated routing promoting automated conversations and improving live representative efficiency for routed manual service mode usages. The intelligent routing solution systems and methods provide a more efficient processing system to efficiently route calls effectively reducing a use of processing power while optimizing system usage and efficiencies to match incoming calls and route the matched and identified incoming calls to an appropriate and effective service mode at a speedier rate, which assist to reduce an amount of customer and representative effort to appropriately address a user's question from the call alongside operating expenses associated with routing and addressing the question. Data analytic insights, such as those associated with unique IDs for identified users and/or other trends based on user activities as described herein to provide contextualized data associated with an incoming, identified call, are integrated from service interactions and user activity. Further, machine learning techniques based on such data analytics, which may include real-time data feeds from web or mobile application tools and/or other internet-of-things resources, for instance, are utilized to predict call reasons and facilitate efficient and effective call routing with a faster processing system through such increased efficiencies of intelligent routing.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing:

Aspect 1. An intelligent routing system including one or more processors, one or more memory components communicatively coupled to the one or more processors, and machine readable instructions stored in the one or more memory components. The machine readable instructions cause the intelligent routing system to perform at least the following when executed by the one or more processors: match a user from a user call with a unique ID associated with the user, generate a plurality of call reason predictions for the user call with an intelligent router module of the intelligent routing system based on the unique ID, generate a confidence level and a likelihood rating with the intelligent router module for each call reason prediction of the plurality of call reason predictions, determine a call reason prediction with a highest likelihood rating and such that the confidence level for the call reason prediction exceeds an associated confidence level threshold that is machine learned and adjustable, determine a call routing service mode from a plurality of service modes based on the call reason prediction, and route the user call to the call routing service mode.

Aspect 2. The intelligent routing system of Aspect 1, further including machine readable instructions that cause the intelligent routing system to perform at least the following when executed by the one or more processors: receive the user call from the user, and identify the user of the user call prior to matching the user from the user call with the unique ID.

Aspect 3. The intelligent routing system of Aspect 1 or Aspect 2, wherein the unique ID includes an associated user profile and an associated user call history Aspect 4. The intelligent routing system of any of Aspect 1 to Aspect 3, wherein the unique ID is an insurance policy number of an insurance policy associated with the user.

Aspect 5. The intelligent routing system of any of Aspect 1 to Aspect 4, wherein the routing logic is configured to associate each of the plurality of call reason predictions with a select service mode of the plurality of service modes.

Aspect 6. The intelligent routing system of any of Aspect 1 to Aspect 5, wherein the user call comprises an event that is one of a call or an electronic communication.

Aspect 7. The intelligent routing system of Aspect 6, wherein the call is from a telephone number associated with the user, and the electronic communication is at least one of an email or an electronic contact from an application tool, the application tool associated with the intelligent routing system and at least one of a mobile client device or other computing device.

Aspect 8. The intelligent routing system of Aspect 6 or Aspect 7, wherein the event is a clickstream event transmitted by the application tool, and the intelligent routing system is configured to count instances of each clickstream event in a set time period prior to the event to generate event count features.

Aspect 9. The intelligent routing system of Aspect 8, wherein the intelligent routing system is configured to combine the event count features with associated event time features to generate combined event features and online monitor the combined event features to generate one or more trends based on user activity patterns.

Aspect 10. The intelligent routing system of Aspect 9, wherein the plurality of call reason predictions are based on the one or more trends based on user activity patterns.

Aspect 11. A method of implementing an intelligent routing system to route a user call, the method, the method including: matching a user from the user call with a unique ID associated with the user, generating a plurality of call reason predictions for the user call with an intelligent router module of the intelligent routing system based on the unique ID, generating a confidence level and a likelihood rating with the intelligent router module for each call reason prediction of the plurality of call reason predictions, determining a call reason prediction with a highest likelihood rating and such that the confidence level for the call reason prediction exceeds an associated confidence level threshold that is machine learned and adjustable, determining a call routing service mode from a plurality of service modes based on the call reason prediction, and routing the user call to the call routing service mode.

Aspect 12. The method of Aspect 11, wherein the unique ID is an insurance policy number of an insurance policy associated with the user.

Aspect 13. A method of implementing an intelligent routing system to route a user call, the method including: matching a user from the user call with a unique ID associated with the user, wherein the unique ID is an insurance policy number of an insurance policy associated with the user, matching a user from the user call with a unique ID associated with the user, wherein the unique ID is an insurance policy number of an insurance policy associated with the user, generating a confidence level and a likelihood rating with the intelligent router module for each call reason prediction of the plurality of call reason predictions, determining a call reason prediction with a highest likelihood rating and such that the confidence level for the call reason prediction exceeds an associated confidence level threshold, determining a call routing service mode from a plurality of service modes based on the call reason prediction, and routing the user call to the call routing service mode.

Aspect 14. The method of Aspect 13, wherein the associated confidence level threshold is machine learned and adjustable.

Aspect 15. The method of any of Aspect 11 to Aspect 14, further including: receiving by the intelligent routing system the user call from the user, and identifying the user of the user call prior to matching the user from the user call with the unique ID.

Aspect 16. The method of any of Aspect 11 to Aspect 15, wherein the unique ID includes an associated user profile and an associated user call history.

Aspect 17. The method of any of Aspect 11 to Aspect 16, wherein the routing logic is configured to associate the plurality of call reason predictions with the plurality of service modes.

What is claimed is:

1. An intelligent routing system comprising:
one or more processors;
one or more memory components communicatively coupled to the one or more processors; and
machine readable instructions stored in the one or more memory components that cause the intelligent routing system to perform at least the following when executed by the one or more processors:
match a user from a user call with a unique ID associated with the user;
generate a plurality of call reason predictions for the user call with an intelligent router module of the intelligent routing system based on the unique ID;
generate a confidence level with the intelligent router module for each call reason prediction of the plurality of call reason predictions;
determine a call reason prediction with a highest confidence level and such that the confidence level for the call reason prediction exceeds an associated confidence level threshold; and
route the user call based on the call reason prediction.

2. The intelligent routing system of claim 1, further comprising machine readable instructions that cause the intelligent routing system to perform at least the following when executed by the one or more processors:
receive the user call from the user; and
identify the user of the user call prior to matching the user from the user call with the unique ID.

3. The intelligent routing system of claim 1, wherein the unique ID includes an associated user profile and an associated user call history.

4. The intelligent routing system of claim 1, wherein the unique ID is an insurance policy number of an insurance policy associated with the user.

5. The intelligent routing system of claim 1, wherein the routing logic is configured to associate each of the plurality of call reason predictions with a select service mode of a plurality of service modes and route the user call to the selected service mode associated with the call reason prediction.

6. The intelligent routing system of claim 1, wherein the user call comprises an event that is one of a call or an electronic communication.

7. The intelligent routing system of claim 6, wherein the call is from a telephone number associated with the user, and the electronic communication is at least one of an email or an electronic contact from an application tool, the application tool associated with the intelligent routing system and at least one of a mobile client device or other computing device.

8. The intelligent routing system of claim 7, wherein the electronic contact is an online activity event.

9. The intelligent routing system of claim 8, wherein the intelligent routing system is configured to count instances of each online activity event in a set time period prior to the event to generate event count features, combine the event count features with associated event time features to generate combined event features, and online monitor the combined event features to generate one or more trends based on user activity patterns.

10. The intelligent routing system of claim 9, wherein the plurality of call reason predictions are based on the one or more trends based on user activity patterns.

11. A method of implementing an intelligent routing system to route a user call, the method comprising:
matching a user from the user call with a unique ID associated with the user;
generating a plurality of call reason predictions for the user call with an intelligent router module of the intelligent routing system based on the unique ID;
generating a confidence level with the intelligent router module for each call reason prediction of the plurality of call reason predictions;
determining a call reason prediction with a highest confidence level and such that the confidence level for the call reason prediction exceeds an associated confidence level threshold; and
routing the user call based on the call reason prediction.

12. The method of claim 11, further comprising:
receiving by the intelligent routing system the user call from the user; and
identifying the user of the user call prior to matching the user from the user call with the unique ID.

13. The method of claim 11, wherein the unique ID includes an associated user profile and an associated user call history.

14. The intelligent routing system of claim 11, wherein the unique ID is an insurance policy number of an insurance policy associated with the user.

15. The intelligent routing system of claim 11, wherein the routing logic is configured to associate the plurality of call reason predictions with a respective service mode of a plurality of service modes and route the user call to the service mode of the plurality of service modes associated with the call reason prediction.

16. A method of implementing an intelligent routing system to route a user call, the method comprising:
matching a user from the user call with a unique ID associated with the user, wherein the unique ID is an insurance policy number of an insurance policy associated with the user and includes an associated user profile;

generating a plurality of call reason predictions for the user call with an intelligent router module of the intelligent routing system based on the unique ID;

generating a confidence level with the intelligent router module for each call reason prediction of the plurality of call reason predictions;

determining a call reason prediction with a highest confidence level and such that the confidence level for the call reason prediction exceeds an associated confidence level threshold; and routing the user call based on the call reason prediction.

17. The method of claim 16, further comprising:

receiving by the intelligent routing system the user call from the user; and identifying the user of the user call prior to matching the user from the user call with the unique ID.

18. The method of claim 16, wherein the unique ID includes an associated user call history.

19. The intelligent routing system of claim 16, wherein the associated confidence level threshold is machine learned and adjustable.

20. The intelligent routing system of claim 16, wherein the routing logic is configured to associate the plurality of call reason predictions with a respective service mode of a plurality of service modes and route the user call to the service mode of the plurality of service modes associated with the call reason prediction.

\* \* \* \* \*